United States Patent [19]
Koseki

[11] 4,186,694
[45] Feb. 5, 1980

[54] TEMPERATURE CONTROL SYSTEM OF AN ENGINE EXHAUST GAS COMPONENT SENSOR

[75] Inventor: Shyushi Koseki, Yokosuka, Japan

[73] Assignee: Nissan Motor Company, Limited, Japan

[21] Appl. No.: 800,328

[22] Filed: May 25, 1977

[30] Foreign Application Priority Data

May 27, 1976 [JP] Japan .................................. 51-67006

[51] Int. Cl.² ............................ F01P 1/06; F01P 3/12
[52] U.S. Cl. ............................... 123/41.31; 123/41.56; 123/41.58; 123/119 A; 123/119 EC; 180/54 A
[58] Field of Search ......... 123/119 A, 119 EC, 41.31, 123/41.56, 41.58; 60/276; 180/54 A

[56] References Cited

U.S. PATENT DOCUMENTS 4,061,117 12/1977 Ikeura ........................... 123/119 EC
4,078,379 3/1978 Minami et al. .......................... 60/276

Primary Examiner—Wendell E. Burns
Attorney, Agent, or Firm—Lane, Aitken & Ziems

[57] ABSTRACT

A jacket conduit which surrounds the exhaust gas at a portion equipped with an engine exhaust gas component sensor and is spaced from the exhaust gas conduit to define an air chamber on same and is formed with an air inlet opening which opens from the atmosphere into the air chamber for admitting atmospheric air thereinto and a flow control valve for controlling the ramming atmospheric air into the air chamber in accordance with the exhaust gas temperature and preferably one of the atmospheric temperature and the engine coolant temperature.

10 Claims, 6 Drawing Figures

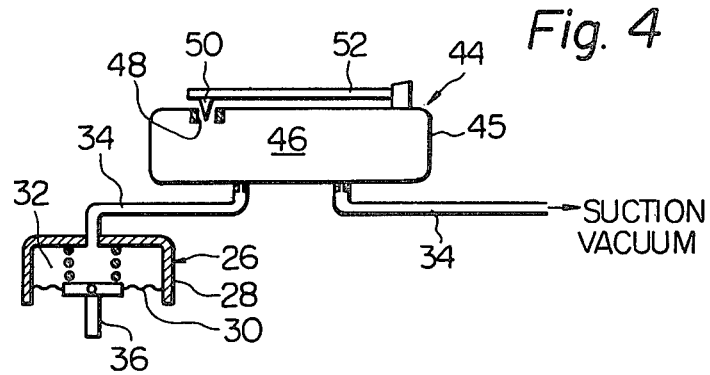
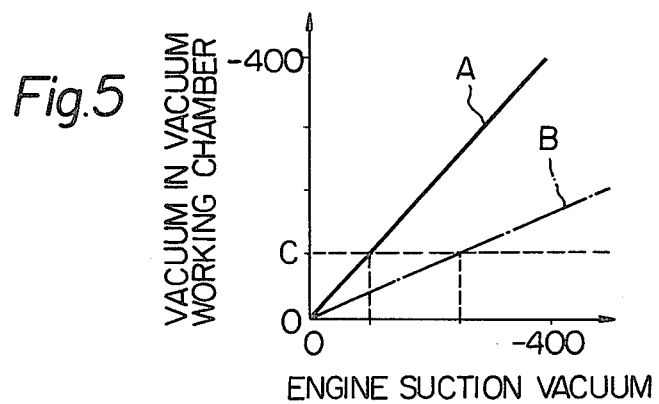
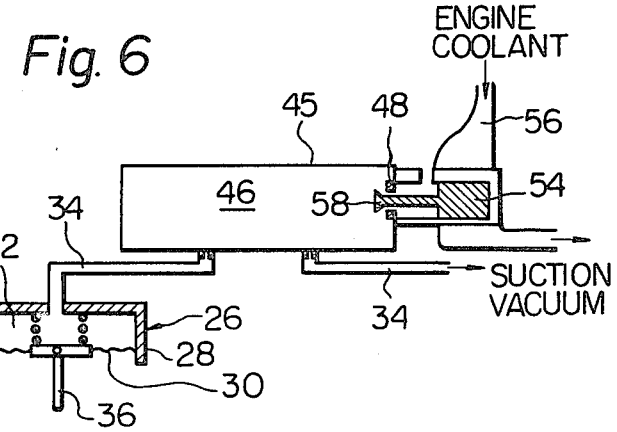

TEMPERATURE CONTROL SYSTEM OF AN ENGINE EXHAUST GAS COMPONENT SENSOR

BACKGROUND OF THE INVENTION

(1) Field of the Invention

The present invention relates generally to a temperature control system of an exhaust gas component sensor for sensing the concentration of a component such as oxygen ($O_2$), carbon monoxide (CO), carbon dioxide ($CO_2$), hydrocarbon (HC) or nitrogen oxide ($NO_x$) contained in exhaust gases produced by an internal combustion engine for a vehicle which concentration is closely related to the air-fuel ratio of an air-fuel mixture burned in the engine or the overall air-fuel ratio of the engine.

(2) Description of the Prior Art

As is well known in the art, as one of the exhaust gas component sensor, for example, an oxygen sensor is formed of a body of zirconium dioxide which is exposed on one surface to a reference oxygen concentration and exposed on a second, opposed surface to an oxygen concentration to be sensed and may, in the presence of thin porous electrically conductive coatings on the two surfaces, generate an electrical potential between the two surfaces which is indicative of the oxygen concentration of the surface to be sensed.

When the sensors are inserted into the exhaust system of an internal combustion engine, by coating the surface of the zirconium dioxide body which is exposed to the exhaust gases with a catalytic metal material, such as platinum, the sensor will generate a relatively large output signal whenever the combustion mixture for the internal combustion engine has been at an air/fuel ratio less than a predetermined air-fuel ratio such as, for example, the stoichiometric mixture ratio and will generate a relatively low signal whenever that mixture has been prepared with an air/fuel ratio greater than the predetermined air/fuel ratio. In other words, the sensor will generate an output signal having a virtual step function, going from high to low at the predetermined air/fuel ratio, for increasing air/fuel ratios. However, when such a sensor is inserted into the exhaust system of an internal combustion engine, it is greatly influenced by the heat of exhaust gases of the engine. When the exhaust gas component sensor is excessively heated, the durability of the sensor is reduced.

Also, the sensing performance of the exhaust gas component sensor is varied in accordance with the temperature thereof. For example, the output of the sensor is relatively low and high when the temperature of the sensor is relatively low and high, respectively at the same air-fuel ratio as shown in FIG. 1 of the accompanying drawings which illustrates the case of the air-fuel ratio A/F being about 14.0:1.

Accordingly, it is necessary to control the temperature of the exhaust gas component sensor to an optimum value for protecting the sensor and stabilizing the output of the sensor. Such a necessity is specially made conspicuous when an exhaust gas component sensor is employed in an air-fuel ratio control system which controls the air-fuel ratio of an air-fuel mixture burned in an engine to a desired air-fuel ratio optimum to operating conditions of the engine in accordance with the relationship between an air-fuel ratio sensed by the sensor and the desired air-fuel ratio.

As factors having influence on the temperature of the exhaust gas component sensor, there is existent both heating due to the heat of the engine exhaust gases and cooling due to the flow of surrounding atmospheric air produced due to travelling of a vehicle equipped with the engine. Since when the engine is running at medium and high speeds, the temperature of the engine exhaust gases is relatively high as shown in FIG. 2 of the accompanying drawings, it is necessary to cool the exhaust gas component sensor by surrounding atmospheric air, while when the engine is idling and running at low speeds, since the temperature of the engine exhaust gases is relatively low as shown in FIG. 2, it is unnecessary to cool the sensor but it is necessary to maintain or to increase the temperature of the sensor.

SUMMARY OF THE INVENTION

It is, therefore, an object of the invention to provide a temperature control system for controlling the temperature of an exhaust gas component sensor of an internal combustion engine to an optimum value or to a proper value by properly adjusting cooling of the sensor by the flow of ambient atmospheric air for controlling heating of the sensor by the heat of the engine exhaust gases.

This object is accomplished by surrounding an exhaust gas conduit at a portion having the sensor by a jacket conduit formed with an air inlet port for passing atmospheric air into the jacket conduit, and by having a flow control valve adjust the degree of opening of the air inlet port in accordance with a factor related to the temperature of the engine to increase and reduce the flow of atmospheric air passing in the jacket conduit.

BRIEF DESCRIPTION OF THE DRAWINGS

This and other features and advantages of the invention will become more apparent from the following detailed description taken in connection with the accompanying drawings in which:

FIG. 4 is a schematic view of a part of a second preferred embodiment of a temperature control system according to the invention;

FIG. 5 is a graphic representation of the relationship between an engine suction vacuum and a vacuum in a vacuum working chamber of the system shown in FIG. 4 when a flow control valve of the system begins to open; and FIG. 6 is a schematic view of a third preferred embodiment a part of a temperature control system according to the invention.

DESCRIPTION OF THE PREFERRED EMBODIMENTS

Figure 1:
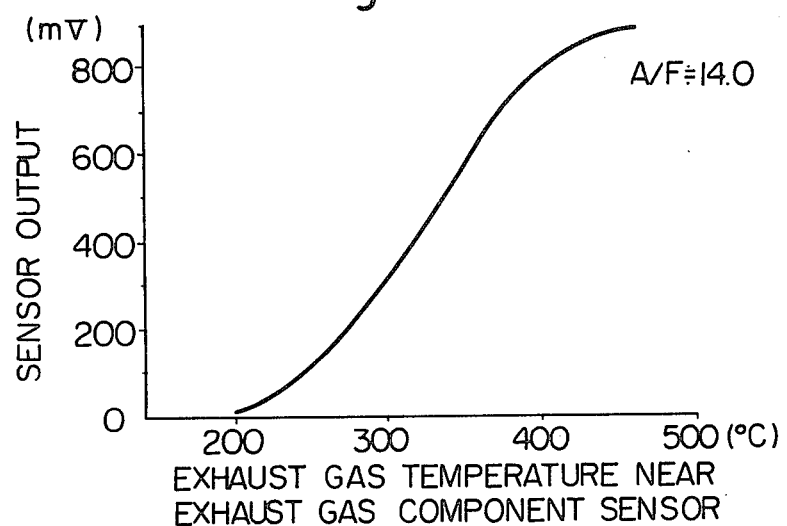
FIG. 1 is a graphic representation of the relationship between the output of an exhaust gas component sensor and the temperature of the sensor as per the introduction of the present specification.
Figure 2:
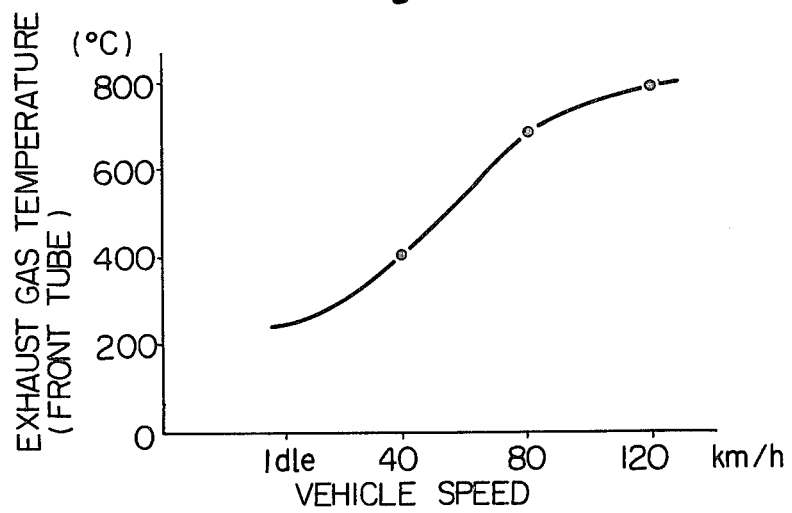
FIG. 2 is a graphic representation of the relationship between the temperature of exhaust gases of an engine and the speed of the engine as per the introduction of the present specification.
Figure 3:
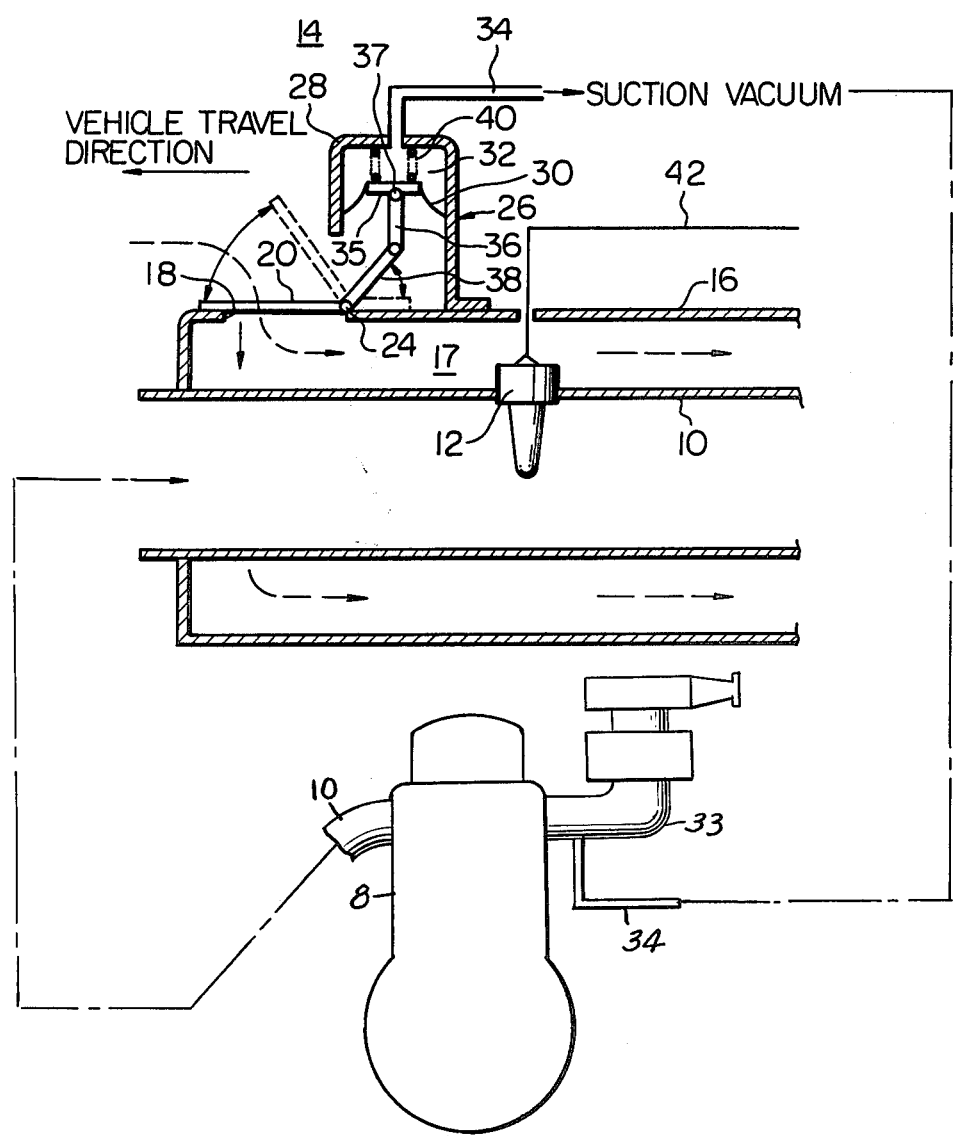
FIG. 3 is a schematic view of a first preferred embodiment of a temperature control system according to the invention.

Referring to FIG. 3 of the drawings, there is shown a temperature control system, according to the invention, of an exhaust gas component sensor of an internal combustion engine. The engine 8 includes an exhaust gas passageway or conduit 10 providing communication between the engine and the atmosphere for conducting thereto exhaust gases emitted from the engine. The exhaust gas component sensor 12 is fixedly secured to the exhaust gas passageway 10 for sensing the concentration of a component such as oxygen ($O_2$), carbon monoxide (CO), carbon dioxide ($CO_2$), hydrocarbon (HC) or nitrogen oxide ($NO_x$) contained in the engine exhaust gases which concentration is closely related to the air-fuel ratio of an air-fuel mixture burned in the engine or to the overall air-fuel ratio of the engine. The exhaust gas component sensor 12 is an oxygen sensor in this embodiment.

The temperature control system, generally designated by the reference numeral 14, comprises a jacket or a conduit 16 concentrically surrounding and spaced from at least a portion of the exhaust gas passageway 10 to define an air chamber 17 between the exhaust gas passageway 10 and the jacket 16 which portion is provided with the exhaust gas component sensor 12. The jacket conduit 16 is fixedly secured to the exhaust gas passageway 10 by suitable fastening means (not shown) such as, for example, brackets, bolts and nuts. The jacket 16 has an air inlet opening or port 18 which is located in front of the exhaust gas component sensor 12 relative to the direction of forward movement of a vehicle (not shown) equipped with the engine and opens from the atmosphere into the jacket conduit 16, and an outlet (not shown) located behind the exhaust gas component sensor 12 relative to the direction of forward movement of the vehicle. In this embodiment, the jacket conduit 16 has a cross section of a cylindrical shape and the air inlet opening 18 is formed through a portion of the circumference of the upstream end as shown in the drawing. A flow control valve 20 is located movably with respect to the air inlet opening 18 for controlling, in accordance with a factor related to the temperature of the engine, the flow of atmospheric air admitted or passing into the jacket conduit 16 through the air inlet opening 18. The flow control valve 20 is operated to close the air inlet port 18 when the temperature of the engine exhaust gases is relatively low as during low speed operations of the engine and to open the air inlet port 18 when the temperature of the engine exhaust gases is relatively high as during medium and high speed operations of the engine. In this embodiment, the flow control valve 20 is in the form of a plate or flap and has forward and rearward end portions arranged longitudinally of the vehicle. The flow control valve is pivotably secured at the rearward end position to the jacket case 16 through a hinge joint 24 which is provided on the jacket 16 adjacent a rearward end of the air inlet opening 18 angularly movably longitudinally of the vehicle. The forward end portion of the flow control valve 20 is seated on and unseated from the jacket 16 at a portion adjacent a forward end of the air inlet 18 when the flow control valve 20 closes and opens the air inlet 18, respectively. The inner surface of the flow control valve 20 is so directed in front of the vehicle that the inner surface receives the flow of air and guides the flow of air from the air inlet 18 into the air chamber 17 when the vehicle travels and the flow control valve 20 opens the air inlet 18. The flow control valve 20 is operated by a vacuum operated diaphragm unit 26 in this embodiment. The diaphragm unit 26 comprises a housing 28 fixedly secured to the jacket conduit 16, and a pressure responsive partition such as a flexible diaphragm 30 defining on one side or the upper side thereof in the drawing a vacuum working chamber 32 in the housing 28. The vacuum working chamber 32 communicates with an intake passageway 33 of the engine through a passage 34 for receiving an engine suction vacuum. The diaphragm 30 communicates on the other side or the lower side 35 thereof in the drawing with the atmosphere and is operatively connected to a rod 36 through a pivotal connection 37. The rod 36 is pivotably connected to a lever 38 which is fixedly connected to the flow control valve 20. The rod 36 and the lever 38 make an angle to each other which is convex at their lower sides downwards in the drawing. The diaphragm 30 has an upper position shown in the drawing in which the flow control valve 20 fully closes the air inlet port 18 and the angle made by the rod 36 and the lever 38 is relatively large, and a lower position in which the flow control valve 20 fully opens the air inlet port 18 as shown by the dotted lines in the drawing and the angle made by the rod 36 and the lever 38 is relatively small. The diaphragm 30 is moved between the upper and lower positions to increase and reduce the degree of opening of the air inlet port 18 in accordance with decreases and increases in the engine suction vacuum in the vacuum working chamber 32, respectively. A spring 40 is provided to urge the diaphragm 30 in a direction opposed by the atmospheric pressure acting on the side 35 of the diaphragm 30. It is desirable to arrange the exhaust gas conduit 10 parallel with a longitudinal direction of a vehicle (not shown) equipped with the engine in order to effectively ram the air flow produced by travelling of the vehicle into the jacket 16 by using the flap as a variable air scoop (as shown in FIG. 3) and directing the scooped air through the air inlet port 18.

The conduit gas component sensor 12 is electrically connected to, for example, a control circuit of an air-fuel ratio control system (both not shown) through a lead wire 42 for feeding an output signal of the sensor 12 to the control circuit.

The temperature control system 14 thus described is operated as follows:

When the engine is idling or is running at a speed within a low speed range, the engine suction vacuum is high. As a result, the diaphragm 30 is moved by the difference between the atmospheric pressure and the engine high suction vacuum overcoming the force of the spring 40 into the upper position shown by the solid lines in the drawing in which the flow control valve 20 closes the air inlet port 18. Accordingly, the jacket 16 prevents the exhaust gas passageway 10 enclosed therein from being cooled by atmospheric air to cause the heat of the engine exhaust gases to heat air in the chamber 17. This results in maintaining the temperature of the air in the chamber 17 and the exhaust gas component sensor 12 at a proper value or increasing the temperature of the air in the chamber 17 and the sensor 12 to a proper value. Accordingly, a decrease in the output of the sensor 12 is prevented or the sensor output is increased, so that the sensor output is stabilized.

When the speed of the engine is increased to a value within a medium speed range, the engine suction vacuum is reduced to allow the resilient force of the spring 40 to move the diaphragm 30 toward the lower position shown by the dotted lines in the drawing. As a result, the flow control valve 20 begins to open the air-inlet port 18 to pass air flow produced due to travelling of the vehicle into the jacket conduit 16 to cool the exhaust gas component sensor 12. The degree of opening of the flow control and subsequent scooping and ramming is increased with decreases in the engine suction vacuum. Although the higher the speed of the engine becomes, the higher the temperature of the engine exhaust gases heating the sensor 12 becomes, since as the speed of the engine becomes higher, the flow rate and the speed of air passing in the jacket 16 are increased to increase the degree of cooling the sensor 12, the temperature of the sensor 12 is controlled to a suitable value or to an optimum value.

Referring to FIG. 4 of the drawings, there is shown a part of a temperature control system according to the invention of an exhaust gas component sensor of an engine which system is characterized in that a vacuum adjusting device 44 is provided in the passage 34. In FIG. 4, like component elements are designated by the same reference numerals as those used in FIG. 3 and the illustration of a part of the same component elements as those shown in FIG. 3 is omitted. The vacuum adjusting device 44 comprises a housing 45 having therein a second vacuum chamber or tank 46 located in the passage 34. The second vacuum chamber 46 is formed with an orifice 48 which provides communication between the chamber 46 and the atmosphere. A control valve 50 is provided for controlling the degree of opening of the orifice 48 or the effective cross sectional area thereof. A thermally sensitive deformable element 52 is provided for operating the control valve 50 in accordance with the temperature of atmospheric air. The element 52 comprises a bimetal in this embodiment and is mounted at an end thereof on the housing 45 externally of the second vacuum chamber 46. The element 52 has a free end deformable in response to the temperature of ambient atmospheric air and operatively connected to the control valve 50. When the temperature of atmospheric air is below a predetermined value, the element 52 assumes a position in which the control valve 50 closes the orifice 48. When the temperature of atmospheric air is above the predetermined value, the element 52 is deformed into a position in which the control valve 50 opens the orifice 48. When the orifice 48 is opened, since atmospheric air is admitted into the vacuum working chamber 32 to reduce the vacuum therein, the flow control valve 20 is opened at an engine suction vacuum higher than or at a speed of the engine lower than that in the case in which the orifice 48 is closed. This relationship is illustrated in FIG. 5 of the drawings. As shown in FIG. 5, assuming that C indicates a vacuum in the vacuum working chamber 32 at which the flow control valve 20 starts to open, the line A indicates the case in which the orifice 48 is closed by the control valve 50, and the line B indicates the case in which the orifice 48 is opened by the control valve 50, an engine suction vacuum at the intersection of the lines B and C is higher than that at the intersection of the lines A and C. In other words, when the temperature of atmospheric air is relatively high, the flow control valve 20 is opened at an engine speed lower than that at which the flow control valve 20 is opened when the temperature of atmospheric air is relatively low to thereby prevent the exhaust gas component sensor 12 from being undesirably heated.

When the control valve 50 is opened, the degree of opening of the orifice 48 depends on the temperature of atmospheric air. Accordingly, at this state, the degree of opening of the flow control valve 20 and a speed of the engine at which the valve 20 begins to open depend on the temperature of atmospheric air.

It is possible to have the element 52 deform in response to the temperature in the chamber 17 in lieu of having the element 52 deform in response to the temperature of the atmosphere.

Referring to FIG. 6 of the drawings, there is shown a temperature control system according to the invention of an exhaust gas component sensor of an engine which system is characterized in that a heat sensitive deformable element 54 is employed which is different from the heat sensitive deformable element 52 of the temperature control system shown in FIG. 4. In FIG. 6, like component elements are designated by the same reference numerals as those used in FIGS. 3 and 4 and the illustration of a part of the same component elements as those shown in FIGS. 3 and 4 is omitted. The heat sensitive deformable element 54 comprises a wax expanding and contracting in dependent on increases and decreases in the temperature of a coolant 56 of the engine, respectively, and is operatively connected to a control valve 58 functioning similarly to the control valve 50 of FIG. 4. When the temperature of the engine coolant 56 is below a predetermined value, the element 54 is contracted to move the control valve 58 into a position to close the orifice 48. When the temperature of the engine coolant 56 is above the predetermined value, the element 54 is expanded to move the control valve 58 into a position to open the orifice 48. With respect to other points, the disclosure made with respect to the temperature control system of FIG. 4 applies to the temperature control system of FIG. 6 despite the substituting the temperature of the engine coolant 56 for the temperature of atmospheric air.

It will be thus appreciated that the invention provides a temperature control system in which a jacket and a flow control valve properly control cooling of an exhaust gas component sensor by the flow of atmospheric air and heating of the sensor by the heat of engine exhaust gases for controlling the temperature of the sensor to an optimum value for preventing the sensor from being damaged by excessive heating and for, when the temperature of the sensor is low, increasing the temperature of the sensor to make the output characteristics thereof stable.

What is claimed is:

1. A temperature control system in combination with an internal combustion engine including:
    means defining an intake passageway for conducting atmospheric air to the engine,
    means defining an exhaust gas passageway for conducting exhaust gases of the engine to the atmosphere, and
    an exhaust gas component sensor fixedly secured to the exhaust gas passageway defining means for sensing the concentration of a component contained in the engine exhaust gases which concentration is closely related to an air-fuel ratio,
    said temperature control system comprising a jacket which surrounds the exhaust gas passageway defining means at a portion equipped with the exhaust gas component sensor and which is spaced from the exhaust gas passageway defining means to define an air chamber therebetween, said jacket having an air inlet which opens from the atmosphere into said air chamber for admitting thereinto atmospheric air for cooling the exhaust gas component sensor,
    a flow control valve for controlling said air inlet, means defining a vacuum chamber which communicates with the intake passageway for receiving a suction vacuum of the engine therefrom, a pressure responsive partition having at a side thereof said vacuum chamber and arranged movably in response to the vacuum in said vacuum chamber, said pressure responsive partition being so operatively connected to said flow control valve that said partition causes said flow control valve to close said air inlet in response to said vacuum chamber above a predetermined value and that said partition causes said flow control valve to open said air inlet in response to a vacuum in said vacuum chamber below said predetermined value and increases and reduces the degree of opening of said flow control valve in accordance with decrease and increase in the vacuum in said vacuum chamber.

2. A temperature control system as claimed in claim 1, in which said pressure responsive partition comprises a flexible diaphragm having at one side thereof said vacuum chamber, a lever fixedly connected to said flow control valve for operating same, and a rod pivotably connected to the other side of said diaphragm and to said lever, said lever and said rod making an angle to each other, said diaphragm having a first position in which said air inlet is closed by said flow control valve and said angle made by said lever and said rod is relatively large and a second position in which said air inlet is fully opened by said flow control valve and said angle made by said lever and said rod is relatively small.

3. A temperature control system as claimed in claim 1, further comprising means defining a passage for conducting the suction vacuum into said vacuum chamber, means defining a second chamber located in said passage and having an orifice opening from the atmosphere into said second chamber, a second control valve for opening and closing said orifice, and control means for causing said second control valve to close and open said orifice in response to temperatures which are related to the temperature of the engine and which are below and above a predetermined value, respectively.

4. A temperature control system as claimed in claim 3, in which said control means comprises a bimetal operatively connected to said second control valve and deformed for closing and opening said second control valve in response to temperatures of ambient atmospheric air which are below and above said predetermined value, respectively.

5. A temperature control system as claimed in claim 3, in which said control means comprises a wax operatively connected to said second control valve and varying the volume thereof for closing and opening said second control valve in response to temperatures of a coolant of the engine which are below and above said predetermined value, respectively.

6. A temperature control system as claimed in claim 1, in which said exhaust gas component sensor comprises an oxygen sensor for sensing the concentration of oxygen contained in the engine exhaust gases.

7. A temperature control system as claimed in claim 1, in which said air inlet is arranged in front of the exhaust gas component sensor relative to the direction of movement of a vehicle equipped with the engine, said jacket having an outlet arranged behind the exhaust gas component sensor relative to the direction of movement of the vehicle, said flow control valve taking the form of a plate and having an inner surface facing said air inlet when said flow control valve closes said air inlet, and forward and rearward end portions arranged longitudinally of the vehicle, said flow control valve being pivotally secured at said rearward end portion to said jacket adjacent a rearward end of said air inlet angularly movably longitudinally of the vehicle, said forward end portion of said flow control valve being seated on and unseated from said jacket at a portion adjacent a forward end of said air inlet when said flow control valve closes and opens said air inlet respectively, said inner surface of said flow control valve being so directed in front of the vehicle that said inner surface receives the flow of air and guides said flow of air from said air inlet into said air chamber when the vehicle travels and said flow control valve opens said air inlet.

8. In a vehicle having a body and an internal combustion engine equipped with an exhaust conduit and an induction manifold, a gas sensor disposed through the wall of said exhaust conduit, said sensor exhibiting optimal performance with a given temperature range;

a jacket disposed about said exhaust conduit so as to enclose the portion of said sensor outboard of said exhaust conduit, said jacket having an inlet port and an outlet port;

means for maintaining the temperature of said sensor within said given temperature range, said means taking the form of:

a vacuum motor having a vacuum chamber fluidly communicated with said induction manifold so as to be exposed to the induction vacuum developed therein; and a flow control valve operatively connected to said vacuum motor, said flow control valve having a flap portion which is movable from an open position toward a position in which it closes said inlet port in response to the increase of said induction vacuum, said flap portion defining an air scoop for variably ramming atmospheric air, flowing from the front of the vehicle in response to the movement of the vehicle, through said inlet port.

9. A vehicle as claimed in claim 8, wherein said temperature maintaining means further comprises:

a vacuum tank fluidly communicating with both of said vacuum chamber and said induction manifold; and a temperature responsive valve responsive to the temperature of the ambient atmosphere for bleeding air into said vacuum tank upon the temperature of said atmosphere exceeding a predetermined level.

10. A vehicle as claimed in claim 8 wherein said temperature maintaining means further comprises:

a vacuum tank fluidly communicating with both of said vacuum chamber and said induction manifold; and a temperature responsive valve responsive to the temperature of the coolant of said internal combustion engine for bleeding air into said vacuum tank in response to the temperature of said coolant exceeding a second predetermined value.

* * * * *